(12) United States Patent
Coulthard et al.

(10) Patent No.: US 10,331,540 B2
(45) Date of Patent: Jun. 25, 2019

(54) IDENTIFYING FALSE POSITIVE AUTOMATED TESTS

(71) Applicant: INTERNATIONAL BUSINESS MACHINES CORPORATION, Armonk, NY (US)

(72) Inventors: Adam P. Coulthard, Hursley (GB); Neil W. Leedham, Hursley (GB); Mark A. Woolley, Hursley (GB); Andy Wright, Hursley (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/085,272

(22) Filed: Mar. 30, 2016

(65) Prior Publication Data
US 2017/0286258 A1 Oct. 5, 2017

(51) Int. Cl.
G06F 11/00 (2006.01)
G06F 11/36 (2006.01)

(52) U.S. Cl.
CPC ........ *G06F 11/3608* (2013.01); *G06F 11/368* (2013.01); *G06F 11/3664* (2013.01); *G06F 11/3684* (2013.01); *G06F 11/3688* (2013.01); *G06F 11/3692* (2013.01)

(58) Field of Classification Search
CPC .. G06F 11/3608; G06F 11/3664; G06F 11/36; G06F 11/3604; G06F 11/3612; G06F 11/3616; G06F 11/3668; G06F 11/3672; G06F 11/3676; G06F 11/368; G06F 11/3684; G06F 11/3688; G06F 11/3692
See application file for complete search history.

(56) References Cited

U.S. PATENT DOCUMENTS

| 6,415,396 | B1 |   | 7/2002 | Singh et al. |
| 8,015,239 | B2 | * | 9/2011 | Sharma ............... G06F 11/3688 709/202 |

(Continued)

FOREIGN PATENT DOCUMENTS

| CN | 103617119 A | 3/2014 |
| GB | 2508643 A | 6/2014 |

OTHER PUBLICATIONS

Ansari, et al., "Optimization of Test Suite-Test Case in Regression Test," Computational Intelligence and Computing Research (ICCIC), 2013, IEEE International Conference on Dec. 26-28, 2013, pp. 1-4.

(Continued)

*Primary Examiner* — Anthony J Amoroso
(74) *Attorney, Agent, or Firm* — Cantor Colburn LLP; Steven Chiu

(57) ABSTRACT

Technical solutions are described for identifying false positive tests. An example method includes receiving an input identifying a defect in a portion of a product code. The method also includes identifying a first automated test that is associated with the portion of the product code. The method also includes lowering a first test confidence value that is associated with the first automated test by a predetermined amount in response to the first automated test being a passing test. The method also includes marking the first automated test as a false positive test.

14 Claims, 4 Drawing Sheets

(56) References Cited

U.S. PATENT DOCUMENTS

| | | | | |
|---|---|---|---|---|
| 8,799,867 | B1* | 8/2014 | Peri-Glass | G06F 11/3668 |
| | | | | 717/100 |
| 9,501,390 | B1* | 11/2016 | Chellappa | G06F 11/3692 |
| 9,847,926 | B2* | 12/2017 | Couture | H04L 43/10 |
| 2006/0085132 | A1* | 4/2006 | Sharma | G06F 11/3688 |
| | | | | 702/1 |
| 2008/0163165 | A1* | 7/2008 | Shitrit | G06F 8/315 |
| | | | | 717/107 |
| 2008/0282124 | A1* | 11/2008 | Esposito | G06F 11/3672 |
| | | | | 714/736 |
| 2009/0265693 | A1 | 10/2009 | Bakowski | |
| 2011/0314343 | A1* | 12/2011 | Hoke | G06F 11/3672 |
| | | | | 714/45 |
| 2013/0024847 | A1* | 1/2013 | Browne | G06F 11/3676 |
| | | | | 717/131 |
| 2016/0085663 | A1* | 3/2016 | Best | G06F 11/3692 |
| | | | | 714/38.1 |
| 2016/0162389 | A1* | 6/2016 | Lachwani | G06F 11/3664 |
| | | | | 714/38.14 |
| 2016/0283353 | A1* | 9/2016 | Owen | G06F 11/3664 |
| 2017/0161179 | A1* | 6/2017 | Maple | G06F 11/3684 |

OTHER PUBLICATIONS

E. Engström et al.,"Improving Regression Testing Transparency and Efficiency with History-Based Prioritization—An Industrial Case Study," 2011 IEEE Fourth International Conference on Mar. 21-25, 2011, pp. 1-10.

Mehvish Rashid, "Evaluating the Effectiveness of Regression Testing," Chalmers University of Technology, University of Gothenburg, Department of Computer Science and Engineering, Göteborg, Sweden, Feb. 2011, pp. 1-33.

\* cited by examiner

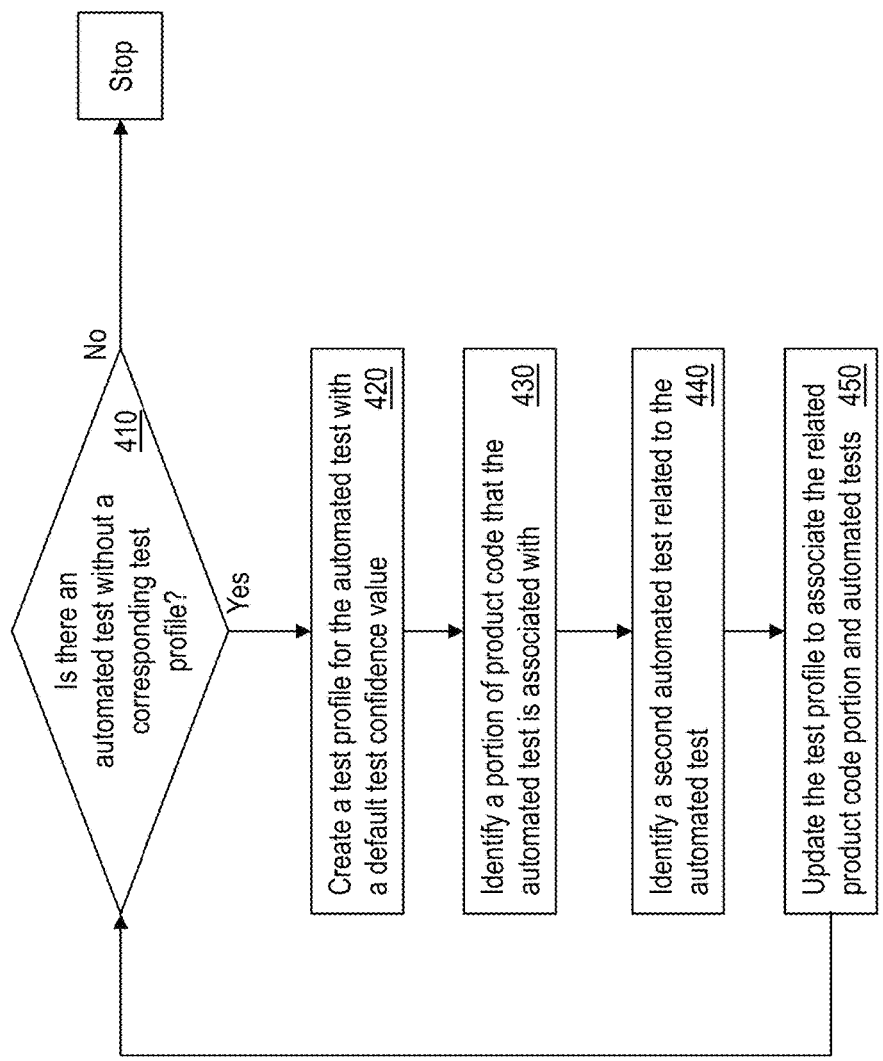

IDENTIFYING FALSE POSITIVE AUTOMATED TESTS

BACKGROUND

The present application relates to computer technology, and more specifically, to testing computer program products.

In computer program products, automated regression testing is typically used to prevent the emergence of bugs, that is defects, which occur over time as source code of the computer program product is modified and/or updated. For example, when a code change is introduced that causes a test to fail, a test automation environment that may use regression testing notifies a manufacturer of the computer program product about the test failure. In response, the manufacturer, such as a software engineer, or any other personnel, typically investigates and fixes the source (or test) code. Thus, the test automation environment can prevent a version of the computer program product that contains a possible defect from being promoted for use by users based on a failed test case.

SUMMARY

According to an embodiment, computer implemented method for identifying false positive tests includes receiving an input identifying a defect in a portion of a product code. The method also includes identifying a first automated test that is associated with the portion of the product code. The method also includes lowering a first test confidence value that is associated with the first automated test by a predetermined amount in response to the first automated test being a passing test. The method also includes marking the first automated test as a false positive test.

According to another embodiment, a system for identifying false positive tests includes a memory and a processor. The processor receives an input identifying a defect in a portion of a product code. The processor also identifies a first automated test that is associated with the portion of the product code. The processor lowers a first test confidence value that is associated with the first automated test by a predetermined amount in response to the first automated test being a passing test. The processor also marks the first automated test as a false positive test.

According to another embodiment, a computer program product for identifying false positive tests includes a computer readable storage medium that includes computer executable instructions. The computer readable storage medium includes instructions to receive an input identifying a defect in a portion of a product code. The computer readable storage medium includes instructions to identify a first automated test that is associated with the portion of the product code. The computer readable storage medium includes instructions to lower a first test confidence value that is associated with the first automated test by a predetermined amount in response to the first automated test being a passing test. The computer readable storage medium includes instructions to mark the first automated test as a false positive test.

BRIEF DESCRIPTION OF THE DRAWINGS

The examples described throughout the present document may be better understood with reference to the following drawings and description. The components in the figures are not necessarily to scale. Moreover, in the figures, like-referenced numerals designate corresponding parts throughout the different views.

FIG. 4 illustrates an example flowchart of creating and/or updating a relatedness network in accordance with an embodiment.

DETAILED DESCRIPTION

Figure 1:
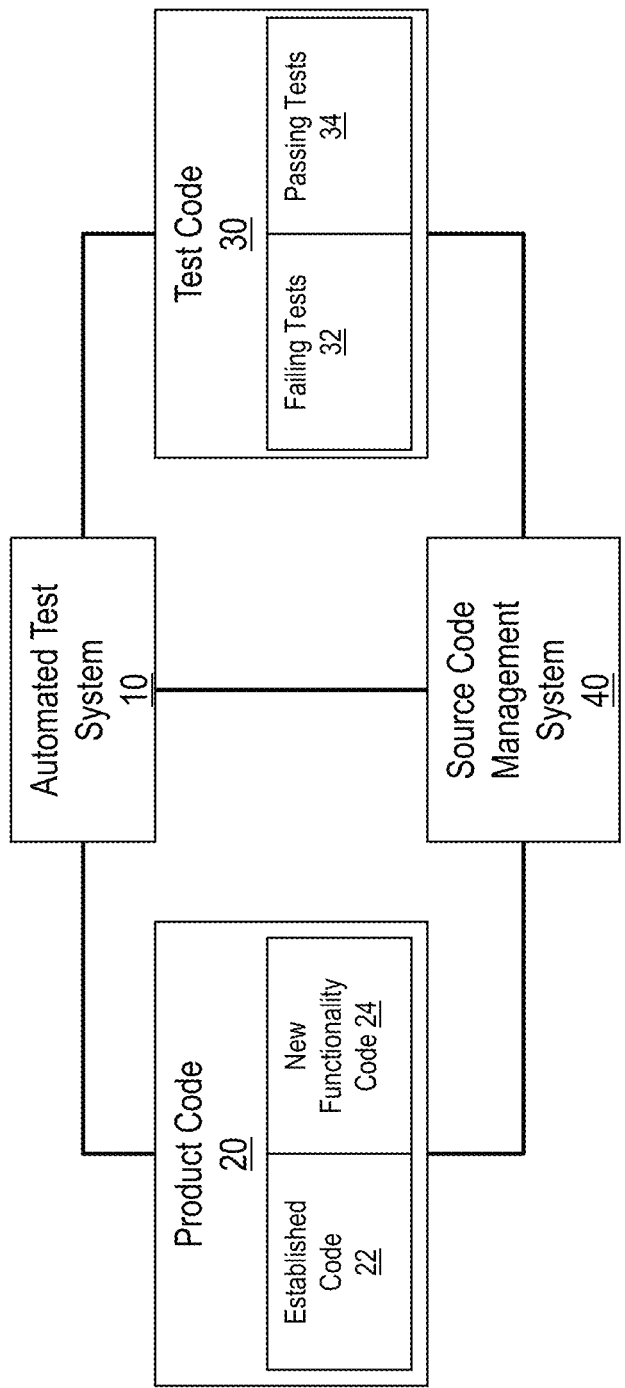
FIG. 1 illustrates an example automated test system in accordance with an embodiment.

Disclosed here are technical solutions for preventing a version of a computer program product that contains a possible defect from being promoted for use by users by identifying a test, which may be likely to pass, even if the functionality of the computer program product that the test is testing fails. The technical solutions thus facilitate improving automated test systems, such as those for a computer program product.

If an automated test system fails to detect, and thus prevent, a defect in a computer program product from reaching a customer, it may be deemed as a failure of the automated test system. Further, if the automated test system prevents a defect in an existing area of the source code (versus source code for new functionality), it may be particularly bad from a customer's point of view as such a defect impacts the customer's existing functionality (versus the new). The technical solutions described herein facilitate a manufacturer of the computer program product to detect, and thus prevent, a defect from reaching a customer, particularly by identifying an automated test, which may be likely to pass, even if the functionality of the computer program product that the automated test is testing fails.

Typically, an automated test may fail to detect a defect, if the automated test itself contains a defect, which leads to two different scenarios. First, the automated test fails when the automated test should not, such as when the product is working as expected. Second, the automated test passes when the automated test should not, such as when the product code is not working as expected. The first case is easily identifiable, by using technology to prompt about and analyze failing tests. However, the second case presents a significant technical problem as such a case involves tests which pass, albeit in error, and hence may not lead to additional review and/or analysis as in the first case. Thus, an automated test system that fails the second case may expose the product defect to the customer, and which results in poor customer satisfaction and increased service costs. Running such an automated test also causes each testing cycle to take longer. Thus, by identifying the automated test that falls in the second case, the technical solutions described herein prevent the defect from being exposed, and thus improve the automated test system.

The technical solutions further facilitate combining metrics from source code management tooling with analysis of the product and test code, and defect data to provide a test confidence value. The test confidence value may be used to determine whether the automated test should be reviewed for quality purposes. By doing so (1) the automated test can be improved and (2) the product defect that was yet to be discovered by customers can be corrected without any impact on customer satisfaction. Based on the test confidence values, the automated test system described herein evaluates passing automated tests, as opposed to further analysis of already failing tests. Thus, the automated test system efficiently targets limited test resources to increase the quality of test automation.

FIG. 1 illustrates an example automated test system. The automated test system 10 may communicate with product code 20 and test code 30. The product code 20 and the test code 30 may be stored in respective code repositories.

The product code 20 include, among other data, the computer executable instructions that are part of the computer program product. The product code 20 may be written in one or more computer programming languages such as C, C++, C#, JAVA, VISUAL BASIC, PROLOG, SQL, PHP, PYTHON, OBJECTIVE C, JAVASCRIPT, or any other programming language or a combination thereof. The product code 20 may include established code 22 and new functionality code 24. The established code 22 may include product code that is part of an existing version of the product. Customers of the product may be using the existing version of the product, and thus the established code 22. The new functionality code 24 may include code that introduces new features or functionality in an upcoming version of the product. Thus, the new functionality code 24 is an unreleased portion of the product code 20, and in turn, an unreleased portion of the product that is to be tested.

The test code 30 includes among other data, computer executable instructions that test the product code 20. The test code 30 includes one or more automated tests that the automated test system 10 executes to test the product code 20. The test code 30 may be written in one or more computer programming languages such as C, C++, C#, JAVA, VISUAL BASIC, PROLOG, SQL, PHP, PYTHON, OBJECTIVE C, JAVASCRIPT, or any other programming language or a combination thereof. The test code 30 may be written in a separate computer programming language than the product code 20. A test in the test code 30 includes computer executable instructions that invoke one or more portions of the product code 20 and an expected result of the invocation. Based on the result of the execution of the test, the test may be one of either failing tests 32 or passing tests 34. The automated test system 10 deems the test as a failing test if, upon execution of the test, the expected result of the test is not satisfied. If the expected result is satisfied, the automated test system 10 deems the test as a passing test.

In an example, the automated test system 10 notifies a manufacturer, such as an engineer or any other personnel, of the product in response to a test failing. In addition, the automated test system 10 may maintain a list of the tests in the test code 30 and results of the respective tests. The automated test system 10 may maintain a repository of such lists for predetermined test executions. The automated test system 10 may execute the tests cases in the test code 30 periodically, such as every week, every month, every day, every hour, or at any other frequency. Alternatively or in addition, the automated test system 10 may execute the tests on demand, for example, in response to the manufacturer triggering execution of the tests. Alternatively or in addition, the automated test system 10 may execute the tests every time the product code 20 and/or the test code 30 is changed.

In addition, the automated test system 10 facilitates executing a selection of tests from the test code 30. For example, the automated test system 10 executes a subset of the tests from the test code 30 in response to a change in a first portion of the product code 20. The subset of the tests executed may be linked to the first portion. The automated test system 10 may link specific tests from the test code 30 with corresponding portions of the product code 20 based on input from the manufacturer. In addition, the automated test system 10 may link specific tests from the test code 30 with corresponding portions of the product code 20 based on information from a source-code management system 40.

The automated test system 10 may communicate with the source-code management system 40 to map the test code 30 and the product code 20. In an example, the source-code management system 40 may include the repositories that store the product code 20 and the test code 30. Alternatively, the source-code management system 40 may communicate with the code repositories that store the product code 20 and the test code 30. The source-code management system 40 may be any source-code management system, such as RATIONAL CLEAR CASE®, MICROSOFT TEAM FOUNDATION SERVER®, GIT®, MERCURIAL®, SUBVERSION®, MICROSOFT VISUAL SOURCE SAFE®, or any other change/version management system.

In an example, the automated test system 10 may use an organization of the files and in-file indicators, such as JAVA package names, in the product code 20 and the test code 30, to identify the relationship between portions of the product code 20 and the test code 30. In addition, or alternatively, the automated test system 10 identifies the relationships between the product code 20 and the test code 30 based on data from the source-code management system 40. For example, the automated test system 10 accesses information about when an automated test was first written, subsequently edited, and who performed such actions. For instance, if a specific portion of the product code 20 and an automated test are edited as part of the same change, the portion and the automated test are likely to be related. Accordingly, the automated test system 10 may map the specific portion and the automated test as being corresponding. The automated test system 10 may add such information to code coverage data that is collected when the test code 30 is executed. The automated test system 10 may also monitor and record test pass and failure rates, and associate such rates with the product and test defects recorded in the source-code management system 40. Thus, the automated test system 10 generates an interconnected map of the product code 20 and the test code 30, the events that lead to creation/modification of the product code 20 and/or the tests in the test code 30, and any subsequent defects from the creation/modification. The automated test system 10 facilitates identification of trends and predictions to be made about other test cases.

In addition, the automated test system 10 facilitates using metrics associated with a first automated test to be used for scoring a predicted failure rate for other tests from the test code 30. Based on the predicted failure rate, the automated test system 10 identifies automated tests, which are more likely to provide false positive results. For example, if automated test T1 for a portion A1 of the product code 20 failed to identify a defect, then the test confidence values of related tests, such as T2, T3, and T4 are lowered, since the related tests share the characteristics of test T1 and/or the portion A1. If by updating the test T1, the defects in the portion A1 are identified and fixed, then over time the automated test system 10 increases the test confidence value of the test T1. In another example scenario, the automated test system 10 identifies and updates test confidence values of the tests based on the confidence value of portion A1 of the product code.

Figure 2:
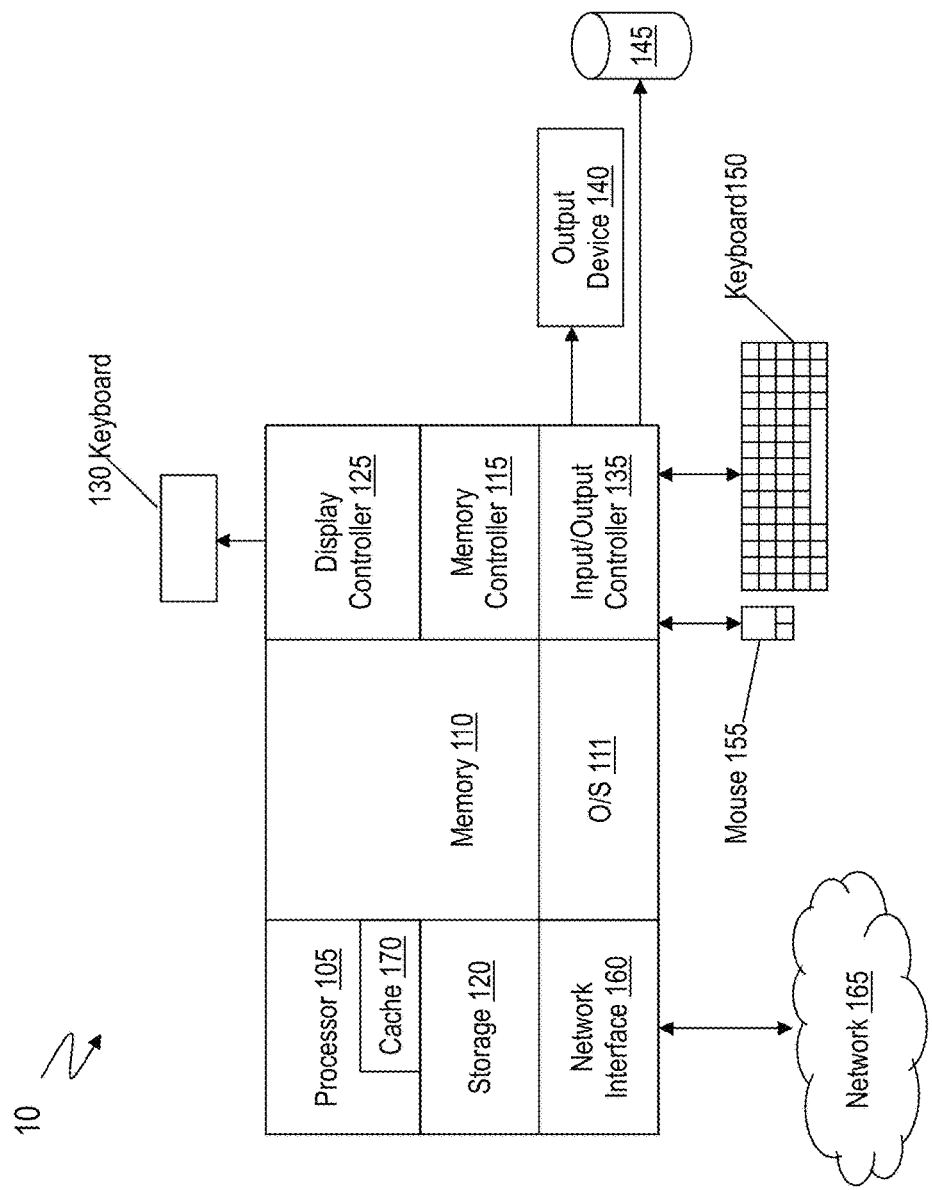
FIG. 2 illustrates components of an example automated test system 10 in accordance with an embodiment.

FIG. 2 illustrates components of an example automated test system 10. The automated test system 10 may be a communication apparatus, such as a computer. For example, the automated test system 10 may be a server computer, a desktop computer, a tablet computer, a laptop computer, a phone, such as a smartphone, a server computer, or any other device that communicates via a network 165.

The automated test system 10 includes hardware, such as electronic circuitry. The automated test system 10 includes, among other components, a processor 105, memory 110 coupled to a memory controller 115, and one or more input devices 145 and/or output devices 140, such as peripheral or control devices, that are communicatively coupled via a local I/O controller 135. These devices 140 and 145 may include, for example, battery sensors, position sensors (altimeter, accelerometer, GPS), indicator/identification lights and the like. Input devices such as a conventional keyboard 150 and mouse 155 may be coupled to the I/O controller 135. The I/O controller 135 may be, for example, one or more buses or other wired or wireless connections, as are known in the art. The I/O controller 135 may have additional elements, which are omitted for simplicity, such as controllers, buffers (caches), drivers, repeaters, and receivers, to enable communications.

The I/O devices 140, 145 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 105 is a hardware device for executing hardware instructions or software, particularly those stored in memory 110. The processor 105 may be a custom made or commercially available processor, a central processing unit (CPU), an auxiliary processor among several processors associated with the automated test system 10, a semiconductor based microprocessor (in the form of a microchip or chip set), a macroprocessor, or other device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, and so on.).

The memory 110 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions. In the example of FIG. 2, the instructions in the memory 110 include a suitable operating system (OS) 111. The operating system 111 essentially may control the execution of other computer programs and provides scheduling, input-output control, file and data management, memory management, and communication control and related services.

Additional data, including, for example, instructions for the processor 105 or other retrievable information, may be stored in storage 120, which may be a storage device such as a hard disk drive or solid state drive. The stored instructions in memory 110 or in storage 120 may include those enabling the processor to execute one or more aspects of the systems and methods of this disclosure.

The automated test system 10 may further include a display controller 125 coupled to a user interface or display 130. In some embodiments, the display 130 may be an LCD screen. In other embodiments, the display 130 may include a plurality of LED status lights. In some embodiments, the automated test system 10 may further include a network interface 160 for coupling to a network 165. The network 165 may be an IP-based network for communication between the automated test system 10 and an external server, client and the like via a broadband connection. In an embodiment, the network 165 may be a satellite network. The network 165 transmits and receives data between the automated test system 10 and external systems. In some embodiments, the network 165 may be a managed IP network administered by a service provider. The network 165 may be implemented in a wireless fashion, for example, using wireless protocols and technologies, such as WiFi, WiMax, satellite, or any other. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet or other suitable network system and may include equipment for receiving and transmitting signals.

The automated test system 10, uses the network 165, to access data about the product code 20 and the test code 30 to build a profile for each automated test in the test code 30. The automated test system 10 accesses the data from various sources, such as the code repository of the product code 20, the code repository of the test code 30, the source-code management system 40, and the like. The automated test system 10 updates the profile for an automated test upon revision of the automated test. Alternatively or in addition, the automated test system 10 updates the profile in response to a revision of a portion of the product code 20 corresponding to the automated test. The automated test system 10 further updates the profile in response to execution of the automated test, for example, if a defect is identified and/or fixed. The automated test system 10 computes a test confidence value for the automated test based on the profile. The automated test system 10, based on the profile, may generate a list of test cases to be reviewed, which are related to the automated test. The automated test system 10 may generate and provide such a list when a defect is identified and/or fixed.

Figure 3:
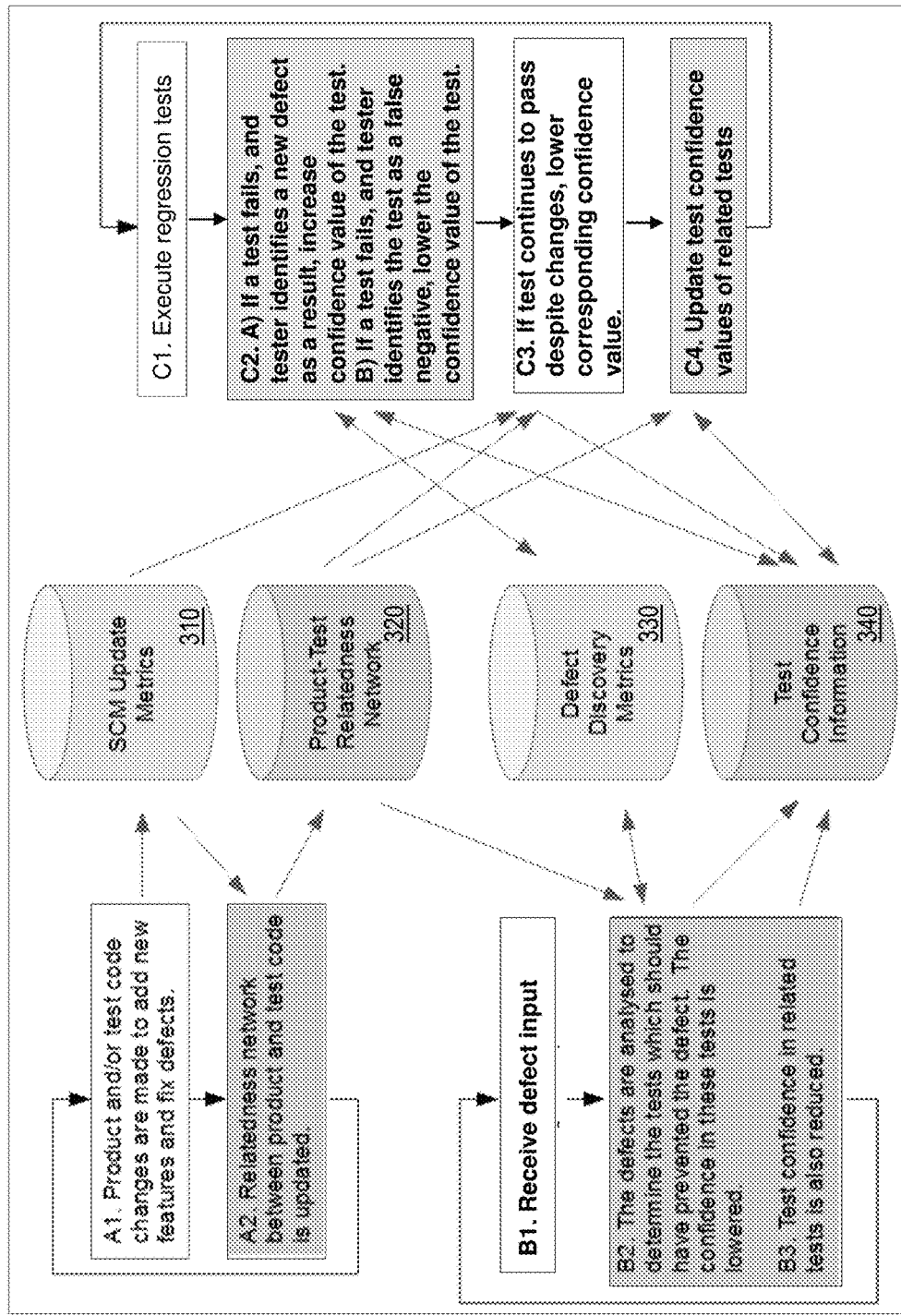
FIG. 3 illustrates a flowchart of an example method implemented by an automated test system to identify false positive tests from test code in accordance with an embodiment.

FIG. 3 illustrates a flowchart of an example method implemented by the automated test system 10 to identify the false positive tests from the test code 30. For example, the manufacturer may change the product code 20 and/or change the test code 30, as shown at block A1. The changes may be to fix defects in the established code 122 or to add new functionality code 134. In response to the changes, the automated test system 10 may initiate gathering updated metrics to update a relatedness network 320 (mapping) between the product code 20 and the test code 30, as shown at block A2. For example, the automated test system 10 may request the source-code management system (SCM) 140 to update the metrics, as shown at block 310. The source-code management system 140 may record metadata associated with the changes made. The metadata collected may include timestamps of when the code was changed, line numbers or function names associated with the portions of the code that was changed, a number of failed compiles (which indicates that the product/test code is difficult to maintain), the particular test group making the changes, and other such metadata regarding the changes. The source-code management system 140 may further collect and record test pass and failure rates.

The automated test system 10, based on the updated metrics updates the relatedness network 320, as shown at block A2. FIG. 4 illustrates an example flowchart of updating the relatedness network 320. For each automated test in the test code 30, the automated test system 10 ensures the existence of a corresponding test profile, as shown at block 410. The relatedness network 320 includes a test profile for each automated test of the test code 30. If an automated test does not have a test profile, the automated test system 10 creates a test profile, which includes a test confidence value associated with the corresponding automated test, as shown at block 420. The test confidence value is based on multiple parameters, such as a number of lines of code being tested by the automated test, a number defects reported for the portion of the product being tested, a number of automated tests associated with the same portion of the product code, and the like. The test confidence value may also be based on test confidence values of other automated tests that are mapped to the corresponding automated test of the test profile. The other automated tests are mapped to the corresponding automated test based on the relatedness network 320.

For example, the automated test system 10 initially assigns each automated test an initial test confidence value, as shown at block 420. The automated test system 10 updates the test confidence value periodically, such as every month, every week, and so on. Alternatively or in addition, the automated test system 10 may update the test confidence value based upon the number of defects found by the automated tests. Alternatively or in addition, the automated test system 10 updates the test confidence value based on a number of defects that the automated test cases did not catch, that is the number of defects that escaped, and were reported either during manual testing or by customers using the product. The test confidence value of the automated test may be increased or decreased according to a function of a defect discovery rate. The defect discovery rate may be based on the number of defects that are detected by the automated tests and the number of defects that escaped. For example, the defect discovery rate may be a ratio of the number of defects detected and the number of defects that escaped. For example, if the defect discovery rate is above a predetermined threshold (for example, >95%), then the automated test system 10 increases the test confidence value, such as according to the function. Conversely, in response to a higher number of escapes, that is the defect discovery rate being below the predetermined threshold the automated test system 10 decreases the test confidence value. The function used to update the test confidence value may be configurable. The automated test system 10 may further use code coverage and defect predictions from the source-code management system 140 to adjust the test confidence values.

An example function for computing the test confidence value is provided below. For example, in responding to defect discovery rates over time, the revised confidence value CV'=the original confidence value CV*((expected discovery rate*normalizing factor)/actual defect rate). Of course, other examples for computing the updated test confidence values are possible.

Returning to FIG. 4, the automated test system 10 determines a portion of the product code 20 that is related to the automated test, as shown at block 430. For example, the automated test system 10 determines which portions of the product code 20 and the test code 30 were changed as part of the same piece of work, for example, based on the changes to both sets of code having timestamps that are within a predetermined range. For example, the automated test system 10 computes a difference between the timestamp associated with a change to the product code 20 and the timestamp associated with a change to the test code 30. The automated test system 10 determines whether the difference is within a predetermined range, such as 10 hours, 5 hours, 30 minutes, or any other predetermined duration. The automated test system 10 determines that the changes to the product code 20 and the test code 30 were part of the same work if the difference in the timestamps is in the predetermined duration. Thus, the automated test system 10, using the timestamps, may identify automated tests and or portions of the product code 20 to which changes are delivered, for example at the end of the working day/week (late on a Friday), and/or which were delivered to the source code management system 40 as part of the same batch of product code 20 and test code 30.

The automated test system 10 further updates the mapping between the product code 20 and the test code 30 to reflect a relatedness between the updated portions of the product code 20 and the test code 30, as shown at block 450. In case the difference is not in the predetermined range, the automated test system 10 may determine relatedness based on other parameters, for example, whether the changes were made by the same person. In yet another example, the automated test system 10 may receive an input that identifies a relatedness relationship between a portion of the product code 20 and a portion of the test code 30.

Thus, the automated test system 10 updates the relatedness network 320 (or mapping) between the product code 20 and the test code 30, which identifies that a portion of the test code 30 is mapped to a specific portion of the product code 20. In other words, the relatedness network 320 identifies a set of automated tests that is associated with the specific portion of the product code 20.

In addition, the automated test system 10 identifies relationships between automated tests, as shown at block 440. Accordingly, the relatedness network 320 keeps track of automated tests that are part of the same work. For example, if two or more automated tests have timestamps that do not differ more than a predetermined threshold, the automated tests may be identified as being related. In another example, automated tests that were created by the same testing entity, such as a tester or a team of testers, may be identified as being related. The automated test system 10 may additionally combine the one or more factors described herein to determine a relationship between two or more automated tests, as shown at block 440. For example, automated tests with timestamps within the predetermined threshold and created by the same person may be identified as being related. Thus, the relatedness network 320 identifies relationships between automated tests and the product code 20, as well as relationships between automated tests within the test code 30. The automated test system 10 may store the relatedness network 320 in a repository. In response to any further changes to the product code 20 and/or the test code 30, the automated test system 10 updates the stored relatedness network 320.

The automated test system 10 receives inputs about product defects detected, as shown at block B1. For example, the automated test system 10 may receive the input based on manual defect testing. Alternatively, or in addition, the input may be based on a defect reported by the customer. Thus, the input may be about a defect that is found internally, such as by manual testing, and/or found by customers using the product. In response to the input, the automated test system 10 identifies the portion of the product code that has the defect. The automated test system 10 further identifies one or more automated tests from the test code 30 that is associated with the defect, as shown at block B2. For example, the automated test system 10 identifies a portion of the product code 20 that resulted in the input defect. Further, using the relatedness network 320, the automated test system 10 determines the one or more automated tests that are associated with the identified defective portion. The automated test system 10 records and updates existing defect discovery metrics 330 based on the received input. For example, the automated test system 10 maintains metrics such as a number of defects associated with a particular portion of the product code 20 and/or associated with a particular automated test. The automated test system 10 may further keep track of a number of defects being reported in the established code 122 and number of defects reported n the new functionality code 124.

In response to identifying the automated test corresponding to the reported defect, the automated test system 10 updates test confidence information 340. The test confidence information 340 is the test confidence values stored in the test profiles of the respective automated tests. For example, lowering the test confidence value in the test profile of the automated test, as shown at block B2. For example, the automated test system 10 may lower the test confidence value by a predetermined value. In addition, the automated test system 10 may lower the confidence values of the other automated tests that are mapped with the identified automated test, as shown at block B3. For example, the other automated tests may be those, which cover the same portion of the product code as the identified automated test. Thus, when the test confidence value of the identified automated test is lowered, related tests, as determined during A2, also have corresponding test confidence values lowered. In an example, the test confidence value of the identified automated test may be reduced by a higher value than the test confidence values of the related automated tests. In an example, the test confidence value of a related automated test is updated based upon a degree of relatedness between the related automated test and the identified automated test. The degree of relatedness may be higher if the two tests are related because of being associated with the same portion of the product code 20, than if the two tests are related because of being created by the same testing entity, such as a tester or a test team. Other parameters that determine the degree of relatedness include related functional areas of the product, related external or internal components of the product being referenced, the date within the product development cycle when the code and/or tests were created or changed, and the like.

The automated test system 10 runs a regression test by executing the automated tests from the test code, as shown at block C1. The results of the regression test runs are analyzed. If an automated test identifies a new defect, the corresponding test confidence value is increased, as shown at block C2. In an example, prior to increasing the confidence value, the automated test system 10 may prompt the manufacturer to confirm that the defect detected is a defect in the product code 20 and not a defect in the test code 30 (that is a false negative). Once the manufacturer confirms that the detected defect is not a false negative, the automated test system 10 continues to increase the test confidence value of the automated test. Else, if the manufacturer indicates that the defect is a false negative, the automated test system 10 does not increase the test confidence value.

Further, the automated test system identifies if an automated test continues to pass over an extended period despite changes to the product code 20, as shown at block C3. For example, the extended period may be a predetermined number of test runs, or a predetermined number of changes to the product code 20, or a predetermined number of changes to the portion of the product code 20 corresponding to the automated test, or a combination thereof. The extended period may also be a predetermined time duration. The automated test system 10 lowers the test confidence value of the automated test that continues to pass over the extended period despite changes being made to the product code 20, and specifically to the portion to which the automated test corresponds, as shown at block C3. The test confidence value may be lowered by a predetermined value. The predetermined value by which the test confidence value is lowered may be based on a defect discovery rate. The defect discovery rate is based on a rate at which code changes are made and defects are injected. In both cases, changes in the test confidence value of a particular automated test, also impacts related tests' confidence values, in some examples to a lesser extent, as shown at block C4. In addition it may be the case that the tests, which had had their confidence lowered are in fact satisfactory but are no longer broad enough or have not been extended sufficiently to cover new functionality within the code under test. Thus, lowering the corresponding test confidence values highlights the tests as seeking further attention.

The example method updates the test confidence values upon execution of the regression tests. Alternatively, or in addition, the test confidence values may be adjusted immediately when a defect is identified or found to have escaped. In either case, in response to a defect escape from an automated test, the automated test system 10 decreases, or lowers the corresponding test confidence value, and the test confidence values of related tests.

Thus, the automated test system 10 monitors the test code 30 to identify the automated tests that may lead to false positives. In response to identifying a potential false positive automated test, the automated test system 10 lowers the corresponding test confidence value of the automated test. Further, the automated test system 10 may lower the test confidence values of automated tests that are related to the identified automated test. The automated test system 10 further updates the test confidence values upon execution of the automated tests. The automated test system 10 may identify the potential false positive automated test in response to changes to the product code 20 and/or the test code 30. Alternatively or in addition, the automated test system 10 identifies the potential false positive automated test in response to a defect being reported during the manual test and/or by a customer during use of the product. Alternatively or in addition, the automated test system 10 identifies the potential false positive automated test in response to a periodic audit/regression run of the test code 30.

Accordingly, the technical solutions herein describe combining metrics from a source-code management system with analysis of the product code and test code, and defect data to provide a test confidence value. The test confidence value is used to mark particular automated tests, which may have test confidence values below a predetermined threshold, to be reviewed for quality purposes. The marked automated tests may be inspected and/or improved to ensure that product defects that were yet to be discovered by customers are corrected without any impact on customer satisfaction.

Further, the technical solutions use the test confidence values for automated test to evaluate passing tests (as opposed to failing tests), to efficiently target limited test resource to increase the quality of test automation. Thus, the technical solutions solve technical problems faced specifically in the field of software testing, and at least, improve technical solutions in this domain. The technical solutions describe generating a test profile for each automated test based on multiple sources of information, such as source-code management repository, product code repository, test code repository, and so on. The test profiles are updated as revisions are made to the test code, the product code. The test profiles are updated when the test code is executed, when defects are identified and fixed, according to a predetermined schedule, or on demand. Each test profile includes the test confidence value for the corresponding automated test.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

The descriptions of the various embodiments of the present technical solutions have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A computer implemented method for identifying false positive tests, the method implemented by a processor, and the method comprising:
   receiving an input identifying a defect in a portion of a product code, the portion being one from a plurality of portions of the product code;
   identifying, by the processor, a first automated test from a plurality of automated tests, the first automated test is associated with the portion of the product code based on a relatedness network that records a mapping between the automated tests and the portions of the product code, the mapping indicative that the first automated test and the portion of the product code were delivered to a source code management system as part of a common batch, maintaining the relatedness network comprising:
      creating a test profile for each automated test from the plurality of automated tests;
      determining that the portion of the product code and the first automated test are part of the common batch based on a difference between a first time stamp of the first automated test and a second timestamp of the portion of the product code being below a predetermined first threshold;
      identifying a second automated test associated with the portion of the product code based on data from the source-code management system; and
      mapping the portion of the product code and the second automated test with the first automated test using the test profile;
   lowering, by the processor, a first test confidence value that is associated with the first automated test by a predetermined amount in response to the first automated test being a passing test; and
   in response to the first test confidence value being below a predetermined second threshold:
      marking, by the processor, the first automated test as a false positive test, wherein the marking indicates that the first automated test failed to identify the defect;
      sending, by the processor, a notification that the first automated test is a false positive test; and
      receiving an updated first automated test in response to sending the notification, wherein the updated first automated test is utilized in subsequent tests of the portion of the product code.

2. The computer implemented method of claim 1, wherein, maintaining the relatedness network further comprises:
   in response to a change to the portion of the product code, identifying the first automated test as being related to the portion of the product code based on metadata associated with the portion of the product code and the first automated test.

3. The computer implemented method of claim 1, wherein the predetermined amount is a first predetermined amount, and the method further comprising:
   lowering a second test confidence value that is associated with the second automated test by a second predetermined amount; and
   in response to the second test confidence value being lower than the predetermined second threshold, marking the second automated test as a false positive test.

4. The computer implemented method of claim 3, wherein identifying the second automated test is further based on a relatedness network that records a relationship between the first automated test and the second automated test.

5. The computer implemented method of claim 4, further comprising, maintaining the relatedness network, wherein the maintaining comprises:
   in response to receiving an updated first automated test, identifying the first automated test as being related to the second automated test based on metadata associated with the first automated test and the second automated test.

6. The computer implemented method of claim 3, wherein the second automated test is identified as being related to the first automated test further based on the first automated test and the second automated test being associated to said portion of the product code.

7. The computer implemented method of claim 1, further comprising:
- executing the first automated test periodically;
- in response to the first automated test passing for at least a predetermined number of times and the portion of the product code being changed, lowering the first test confidence value of the first automated test by the predetermined amount; and
- in response to the first test confidence value being lower than the predetermined second threshold, marking the first automated test as a false positive test.

8. A system for identifying false positive tests, the system comprising:
- a memory; and
- a processor configured to:
  - receive an input identifying a defect in a portion of a product code, the portion being one from a plurality of portions of the product code;
  - identify a first automated test from a plurality of automated tests, the first automated test is associated with the portion of the product code based on a relatedness network that records a mapping between the automated tests and the portions of the product code, the mapping indicative that the first automated test and the portion of the product code were delivered to a source code management system as part of a common batch, maintaining the relatedness network comprising:
    - creating a test profile for each automated test from the plurality of automated tests;
    - determining that the portion of the product code and the first automated test are part of the common batch based on a difference between a first time stamp of the first automated test and a second time stamp of the portion of the product code being below a predetermined first threshold;
    - identifying a second automated test associated with the portion of the product code based on data from the source-code management system; and
    - mapping the portion of the product code and the second automated test with the first automated test using the test profile;
  - lower a first test confidence value that is associated with the first automated test by a predetermined amount in response to the first automated test being a passing test; and
  - in response to the first test confidence value being below a predetermined second threshold:
    - marking the first automated test as a false positive test, wherein the marking indicates that the first automated test failed to identify the defect;
    - sending, by the processor, a notification that the first automated test is a false positive test; and
    - receiving an updated first automated test in response to sending the notification, wherein the updated first automated test is utilized in subsequent tests of the portion of the product code.

9. The system of claim 8, wherein the predetermined amount is a first predetermined amount, and the processor is further configured to:
- lower a second test confidence value that is associated with the second automated test by a second predetermined amount; and
- in response to the second test confidence value being lower than the predetermined second threshold, mark the second automated test as a false positive test.

10. The system of claim 9, wherein the second automated test is identified as being related to the first automated test further based on the first automated test and the second automated test being associated to said portion of the product code.

11. The system of claim 8, wherein the processor is further configured to:
- execute the first automated test periodically;
- lower the first test confidence value of the first automated test by the predetermined amount, in response to the first automated test passing for at least a predetermined number of times and the portion of the product code being changed; and
- mark the first automated test as a false positive test, in response to the first test confidence value being lower than the predetermined second threshold.

12. A computer program product for identifying false positive tests, the computer program product comprising a computer readable storage medium, the computer readable storage medium comprising computer executable instructions, wherein the computer readable storage medium comprises instructions to:
- receive an input identifying a defect in a portion of a product code, the portion being one from a plurality of portions of the product code;
- identify a first automated test from a plurality of automated tests, the first automated test is associated with the portion of the product code based on a relatedness network that records a mapping between the automated tests and the portions of the product code, the mapping indicative that the first automated test and the portion of the product code were delivered to a source code management system as part of a common batch, maintaining the relatedness network comprising:
  - creating a test profile for each automated test from the plurality of automated tests;
  - determining that the portion of the product code and the first automated test are part of the common batch based on a difference between a first time stamp of the first automated test and a second time stamp of the portion of the product code being below a predetermined first threshold;
  - identifying a second automated test associated with the portion of the product code based on data from the source-code management system; and
  - mapping the portion of the product code and the second automated test with the first automated test using the test profile;
- lower a first test confidence value that is associated with the first automated test by a predetermined amount in response to the first automated test being a passing test; and
- in response to the first test confidence value being below a predetermined second threshold:
  - mark the first automated test as a false positive test, wherein the marking indicates that the first automated test failed to identify the defect;
  - sending, by the processor, a notification that the first automated test is a false positive test; and
  - receiving an updated first automated test in response to sending the notification, wherein the updated first automated test is utilized in subsequent tests of the portion of the product code.

13. The computer program product of claim 12, wherein the predetermined amount is a first predetermined amount, and the computer readable storage medium further comprises instructions to:

lower a second test confidence value that is associated with the second automated test by a second predetermined amount; and mark the second automated test as a false positive test, in response to the second test confidence value being lower than the predetermined second threshold.

14. The computer program product of claim 12, wherein the computer readable storage medium further comprises instructions to:

execute the first automated test periodically;

lower the first test confidence value of the first automated test by the predetermined amount, in response to the first automated test passing for at least a predetermined number of times and the portion of the product code being changed; and mark the first automated test as a false positive test, in response to the first test confidence value being lower than the predetermined second threshold.

* * * * *